United States Patent [19]

Chang et al.

[11] Patent Number: 5,254,642
[45] Date of Patent: Oct. 19, 1993

[54] THERMOPLASTIC POLYESTER LOW PROFILE ADDITIVES FOR VINYL ESTER/POLYESTER RESINOUS COMPOSITIONS

[75] Inventors: Ken K. Chang, Dublin; Timothy A. Tufts, Powell, both of Ohio

[73] Assignee: Ashland Oil, Inc., Ashland, Ky.

[21] Appl. No.: 940,972

[22] Filed: Sep. 12, 1992

[51] Int. Cl.$^5$ ............................................. C08F 20/20
[52] U.S. Cl. ..................... 525/438; 525/39; 525/40; 525/49
[58] Field of Search .................... 525/438, 39, 40, 49

[56] References Cited

U.S. PATENT DOCUMENTS 4,210,571 7/1980 Herman .

Primary Examiner—Melvyn I. Marquis
Assistant Examiner—D. Aylward
Attorney, Agent, or Firm—Mueller and Smith

[57] ABSTRACT

The present invention is based on the unexpected discovery that the low profile additives (LPA) disclosed in U.S. Pat. No. 5,116,917 provide effective shrinkage control when used with various blends of vinyl ester and polyester resin systems. This LPA is unique in that its low profile efficiency is not affected by the different reactivities displayed by blends of vinyl ester resin and polyester resin at different blend ratios. This LPA is equally effective in formulations of all vinyl ester resin, all polyester resin, or any combination of such two resins. The present invention, then, is directed to a thermosettable resinous composition of between about 0 and 95 wt-% of a thermosettable vinyl ester resin; between about 5 and 100 wt-% of a thermosettable polyester resin; and between about 5 and 40 wt-% of a low profile additive comprising a non-gelling, saturated polyester formed from dibasic acid and an EO/PO block copolymer having an EO/PO molar ratio ranging from about 0.1 to 0.9, said polyester having an acid value of greater than about 10. The EO/PO polyether polyol can be built on a combination of diol, triol or other compound with active hydrogen groups, so long as the LPA product does not gel.

20 Claims, 1 Drawing Sheet

THERMOPLASTIC POLYESTER LOW PROFILE ADDITIVES FOR VINYL ESTER/POLYESTER RESINOUS COMPOSITIONS

BACKGROUND OF THE INVENTION

The present invention relates to thermosettable vinyl ester/polyester resinous compositions (e.g. sheet molding compound or SMC) and more particularly to new low profile additives (LPAs) therefor.

Vinyl ester resinous compositions are liquid thermosetting resins which are the reaction product of about equal amounts of a polyepoxide and an unsaturated monocarboxylic acid. These resins often are used in combination with fibrous reinforcement and inert fillers to manufacture composite structures often called sheet molding compound or SMC. One way to make such composite structures is to pre-mix the resin, filler, fibrous reinforcement, and other additives to form the molding compound. The molding compound then can be formed into the desired shape and cured in a heated, matched metal dye. An improvement in the process is chemical thickening of the relatively low viscosity liquid resin, e.g. with a Group II metal oxide or hydroxide and water, to form a high viscosity gel after the resin has been mixed with all other ingredients in the molding compound. This thickening or B-staging has several advantages. Unthickened molding compounds are sticky masses which are difficult to handle. After B-staging, they are firm solids whose surfaces are dry. In this form, they can be handled easily. During the molding operation, the molding compound flows within the die set to fill the die cavity. The increased viscosity of B-staged molding compounds inhibits segregation of the various components of the molding compound during flow and promotes compositional uniformity of the composite over the entire volume of the structure.

The advent of low shrink-low profile additives has led to a considerable growth in sheet molding compounds and bulk molding compounds, such as described above. Previous to the development of these additives, reinforced molded parts had rippled or undulating surfaces, which required laborious sanding operations or other corrective measures to obtain painted parts with a metal-like appearance. The low shrink-low profile additives exhibited great benefits to providing exceptionally smooth surfaces.

Polyether polyols have been used as anti-shrink or low profile control additives in unsaturated polyester systems (U.S. Pat. Nos. 4,472,544 and 4,483,963). U.S. Pat. No. 4,472,554 describes the usage of a very high level of acidified polyethertriol as the shrinkage control additive. U.S. Pat. No. 4,483,963 describes the reaction product of oligoester with unsaturated polyester as the low profile additive (LPA) for unsaturated polyester systems. In vinyl ester systems, polyether polyols also have been reported as being useful as low profile additives (U.S. Pat. Nos. 4,151,219, 4,347,343, and 4,824,919). Most of the molecular weights in compositions of prior art polyethers have disadvantages. For example, their molecular weights tend to be too low for good shrink control and most are not compatible with vinyl ester resins.

Moreover, the low profile efficiency of most low profile additives is sensitive to the type of resin used. For example, Arakawa et al., "Factors Affecting Surface Smoothness and the Role of Unsaturated Polyester Resin and Glass Fiber", Section 1A, 47th Annual SPI Conference, February, 1992, report that the linear shrinkage of SMC is related to the reactivity of unsaturated polyester resin. The more reactive the resin is that is used in SMC, the less the shrinkage of the SMC. This result indicates that the molecular structure of the unsaturated polyester affects the low profile efficiency (or shrink control) of the LPA used in SMC. Lin et al., "A Study of Low Profile Additive on the Surface Morphology of Vinyl Ester SMC", Section 6E, 45th Annual SPI Conference, February, 1990, also report that one LPA used in the unsaturated polyester had very good shrinkage control while the same LPA used in vinyl ester resin did not provide good shrinkage control.

BROAD STATEMENT OF THE INVENTION

The present invention is based on the unexpected discovery that the low profile additive (LPA) disclosed in U.S. Pat. No. 5,116,917 (expressly incorporated herein by reference) provides effective shrinkage control in various blends of vinyl ester and polyester resin systems. This LPA is unique in that its low profile efficiency is not affected by the different reactivities displayed by blends of vinyl ester resin and polyester resin at different blend ratios. This LPA is equally effective in formulations of all vinyl ester resin, all polyester resin, or any combination of such two resins.

The present invention, then, is directed to a thermosettable resinous composition which comprises:
(a) between about 0 and 95 wt-% of a thermosettable vinyl ester resin;
(b) between about 5 and 100 wt-% of a thermosettable polyester resin; and
(c) between about 5 and 40 wt-% of a low profile additive (LPA) comprising a non-gelling, saturated polyester formed from dibasic acid and an EO/PO block copolymer having an EO/PO molar ratio ranging from about 0.1 to 0.9, said polyester having an acid value of greater than about 10.

The EO/PO polyether polyol can be built on a combination of diol, triol or other compound with active hydrogen groups, so long as the LPA product does not gel. LPA (c) can be supplied as a concentrate, for example, with vinyl ester resin (a).

Advantages of the present invention include LPAs especially adapted for use with vinyl ester resins, polyester resins, and blends of such resins. Yet another advantage is a vinyl ester resin/polyester resin/LPA system which exhibits good mechanical properties and shrinkage control independent of the ratio of the resins. These and other advantages will be readily apparent to those skilled in the art based upon the disclosure contained herein.

Figure 1:
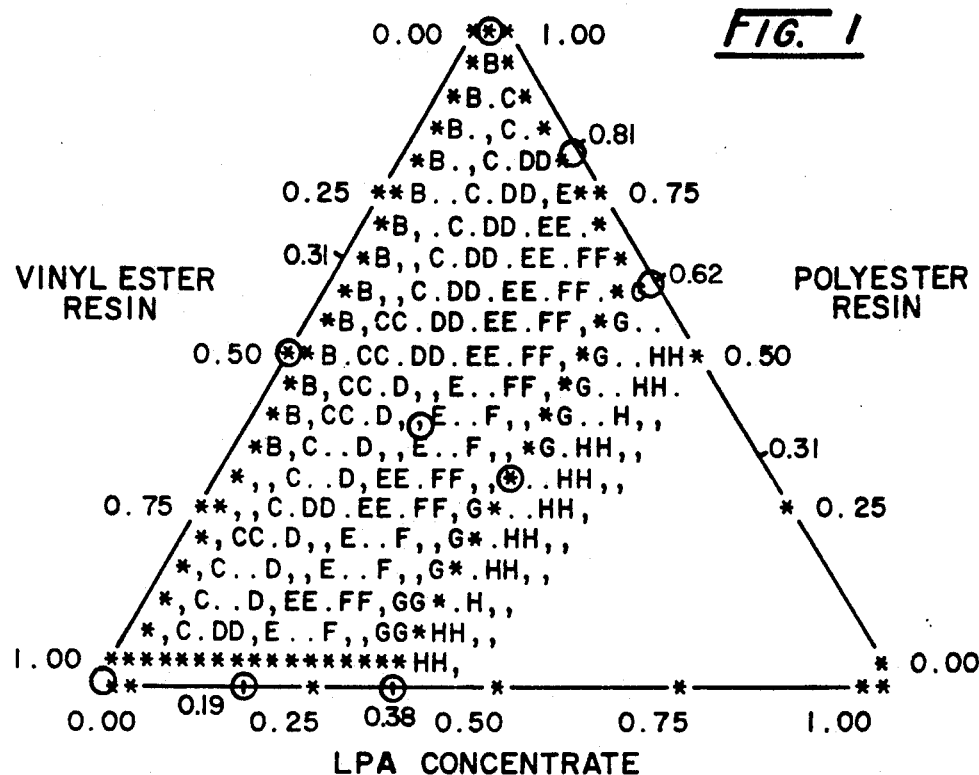
FIG. 1 is a contour plot depicting the trends of shrinkage of SMC reinforced plaques versus ternary compositions of Example 4.

The drawings will be described in detail in Example 4 below.

DETAILED DESCRIPTION OF THE INVENTION

Referring initially to the ethylene oxide/propylene oxide (EO/PO) polyether polyol block copolymer component of the low profile additive (LPA) of the present invention as disclosed in the '917 patent, the molar ratio of EO to PO ranges from about 0.1 to about 0.9. Ethylene oxide and propylene oxide can be co-reacted to form the polyether polyol, or the polyether polyol can be built on a di- or tri-functional compound which contains groups reactive with ethylene oxide and propylene oxide. Such suitable groups include, for example, hydroxyl groups, thiol groups, acid groups, and amine groups. Accordingly, diols, triols, dithiols, trithiols, diacids, triacids, diamines, triamines and the like are suitable multi-functional compound which can be reacted with ethylene oxide and propylene oxide for synthesizing the EO/PO block copolymer of the present invention. Suitable such compounds include, for example, alkylene glycols, typically ranging from about 2 to 8 carbon atoms (including cycloalkylene glycols). Illustrative of such diols are ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methyl pentane, 1,5-diol, 1,4-cyclohexanedimethanol, and the like, and mixtures thereof. Diethylene glycol, dipropylene glycol, triethylene glycol, tripropylene glycol, and the like additionally can be used as necessary, desirable, or convenient. Suitable tri-functional compounds include, for example, glycerin, trimethylol propane, pentaerythritol, and like triols; dithioerythritol, dithiothritol, citric acid, trioxypropylene triamine, trioxyethylene triamine, and the like, and mixtures thereof.

In building the EO/PO block copolymer, it is important that the LPA does not gel, but remain a liquid, which requirement places molecular weight and branching restrictions on the block copolymer as those skilled in the art will appreciate. Additionally, the block copolymer should not contain ethylenic unsaturation in the backbone.

The block copolymer then is reacted with a dibasic acid, which can be aliphatic or aromatic. Examples of dibasic acids well known in the polyester art include, for example, glutaric acid, adipic acid, pimelic acid, suberic acid, azelaic acid, sebasic acid, dodecanedioic acid, isophthalic acid, orthophthalic acid, terephthalic acid, corresponding anhydrides, and the like, and mixtures thereof. Preferably, such suitable dicarboxylic acids contain from about 4 to 12 carbon atoms.

Generally, the temperature of esterification is maintained in the range of about 150°-230° C. and an esterification catalyst is used. Such catalysts are conventional and include, for example, titanium tetrachloride, zinc acetate, zinc oxide, stannous oxylate, dibutyl tin oxide, and the like. Conventional color stabilizers, e.g., trilauryl phosphite or the like, also can be included in the reaction mixture. The proportion of acid to EO/PO block copolymer is such that the resulting LPA has an acid value of greater than 10 and such value can range on up to about 30. Additionally, the molecular weight of the LPA is preferred to be over 6,000 with a useful range of molecular weight being up to about 60,000.

Referring to the vinyl ester resins, reference is made to the following citations which are expressly incorporated herein by reference: U.S. Pat. Nos. 3,564,074, 4,151,219, 4,347,343, 4,472,544, 4,483,963, 4,824,919, 3,548,030, and 4,197,390. These resin systems include a terminally unsaturated vinyl ester resin in admixture with at least one copolymerizable monomer. Generally, the resins are mixed with styrene for thermally cured reinforced articles, but for radiation cure other monomers are more preferable, including, for example, alkyl acrylates or hydroxy alkyl acrylates. Terminally unsaturated vinyl ester resins, as taught in the foregoing citations, are prepared by reacting about equivalent proportions of a polyepoxide and an unsaturated monocarboxylic acid wherein the resulting resin has terminal, polymerizable unsaturated groups. For example, twp equivalents of methacrylic acid may be reacted with two equivalents of a polyepoxide resin to produce a vinyl ester resin. As stated above, vinyl ester resins are well known in the art as set forth in the citations set forth above. The proportion of inventive LPA incorporated into the vinyl ester/polyester resinous composition generally ranges from about 5 to 40 weight parts per 100 weight parts of resinous composition.

Referring to the polyester resins, thermosetting (unsaturated) polyesters known in the SMC art can be used as is necessary, desirable, or convenient, though preferably iso polyesters (i.e., polyesters made with isophthalic acid or anhydride) are used in making the novel resinous compositions of the present invention due to the enhanced corrosion resistance displayed by such iso polyesters. Reference is made to the art cited above which discloses various unsaturated polyester resins which can be used in the novel resinous compositions. As taught in the art, unsaturated polyesters are the reaction product of a dicarboxylic acid or anhydride and a polyhydric alcohol. Representative unsaturated dicarboxylic acids include, for example, maleic acid, fumaric acid, tetrahydrophthalic acid, hexachloroendomethylene tetrahydrophthalic anhydride ("chlorendic anhydride"), Diels-Alder adducts of maleic acid with compounds having conjugated olefinic unsaturation, such adducts being exemplified by bicyclo[2.2.1-]hept-5-ene-2,3-dicarboxylic anhydride, methyl maleic acid, and itaconic acid (and corresponding anhydrides where appropriate).

In addition to the unsaturated acid or anhydride component, saturated and/or aromatic dicarboxylic acids or anhydrides also can be employed in producing the polyester. Such acids include, for example, phthalic acid, terephthalic acid, hexahydrophthalic acid, isophthalic acid, adipic acid, dimer acids (i.e., dimerized acids), and their corresponding anhydrides where appropriate). As stated above, isophthalic acid is a preferred ingredient used in synthesizing the polyester resin component.

Polyols used in synthesizing the polyester resin include, for example, ethylene glycol, diethylene glycol, dipropylene glycol, butylene glycols, neopentyl glycol, glycerol, and 1,1,1-trimethylolpropane. Some triol content can be included, but as a rule this should not more than about 20 mole-%.

Additionally, additives incorporated into the novel resinous compositions are conventional in nature. Accordingly, suitable curing agents, accelerating agents, and the like are incorporated. Reinforcement and inert additives and fillers such as glass, metal filings, and inorganic fillers such as sand or clay also are appropriate. Pigments, release agents, plasticizers, and the like also are used as is necessary, desirable, or convenient in conventional fashion. The compounding of such vinyl ester/polyester/LPA resinous compositions is well known in the art and little more need be said with respect thereto here.

The following examples show how the present invention has been practiced, but should not be construed as limiting. In this application, all percentages and proportions are by weight and all units are in the metric system, unless otherwise expressly indicated. Also, all citations are expressly incorporated herein by reference.

EXAMPLE 1

In order to prepare the inventive polyester LPA, 800 g of BASF-628 EO/PO block polyether polyol (typical properties: OH no. 24.5 mg KOH/gm, pH apparent 9.1, density @ 25° C. 8.5 lbs/gal, and Brookfield viscosity @ 25° C. 1,100 cps), 50 g of isophthalic acid, and 0.82 g of monobutyl tin oxide were charged into a 2-liter glass reactor. A nitrogen sparge was maintained in the reactor and the contents heated to 215° C. This reaction temperature was held until the acid value was determined to be between about 12 and 15. The reactor contents then were cooled to 150° C. and 13 g of phthalic anhydride were charged into the reactor. The reactor temperature was maintained at 150° C. for two additional hours. The acid value of the resulting polyester LPA was between about 20 and 25.

The reactor contents there were cooled to 140° F. Benzoquinone (0.23 g) was dissolved into 288.6 g of styrene and this mixture charged into the reactor. The resulting acid value of the reactor contents was between about 13 and 18. The resulting product was a 75% solution of the polyester LPA of the present invention in styrene. This solution will be used as the LPA in the remaining examples.

EXAMPLE 2

A thickenable vinyl ester resin suitable for SMC application was prepared in a two-liter resin kettle equipped with a stirrer, temperature controller, oxygen sparge tube, and condenser. Into the reactor was charged: an epoxy resin, 529.5 wt-parts of a glycidyl polyether of 2,2-bis(4-hydroxyphenyl)propane having Mn=350 and an equivalent weight of about 170-190, 2,2-bis(4-hydroxyphenyl)propane (157.8 wt-parts), and tetramethylammonium chloride (0.54 wt-parts). This mixture was heated for one hour at 171° C. Thereafter, methacrylic acid (128.8 wt-parts), hydroquinone (0.927 wt-parts), and additional tetramethylammonium chloride (4.36 wt-parts) was added to the reactor and the combined mixture heated for three hours at 115° C. under a nitrogen/air sparge.

After cooling the reaction mixture, 547 wt-parts of styrene was added. The kettle then was heated to 76° C. and 13.6 wt-parts of maleic anhydride and 0.16 wt-parts of benzoquinone were added to the kettle. The reaction temperature then was maintained between about 76° and 80° C. for one-half hour. Thereafter, an additional 20.53 wt-parts of maleic anhydride were added to the kettle and the reaction temperature maintained at about 76°-80° C. for another half hour. The final acid value of the thickenable vinyl ester resin was 30.

EXAMPLE 3

In order to demonstrate the shrinkage control exerted by the LPA in formulations of thermosettable vinyl ester resin and thermosettable polyester resin, the following glass reinforced formulations were compounded and the mechanical properties determined, as set for below:

TABLE 1

| Formulation | Sample (wt-parts) | | |
|---|---|---|---|
| | A | B | C |
| Vinyl ester resin of Example 2[1] | — | 62 | 31 |
| Polyester resin[2] | 62 | — | 31 |

TABLE 1-continued

| Formulation | Sample (wt-parts) | | |
|---|---|---|---|
| | A | B | C |
| LPA concentrate[3] | 38 | 38 | 38 |
| Styrene | 5 | 5 | 5 |
| t-Butyl perbenzoate | 1 | 1 | 1 |
| t-Butyl peroctoate | 1 | 1 | 1 |
| Zinc stearate | 4.5 | 4.5 | 4.5 |
| CaCO$_3$ | 160 | 160 | 160 |
| MgO[4] | 15 | 15 | 15 |
| 1" Glass | 123 | 123 | 123 |

[1]60% solids in styrene.
[2]AROPOL ™ 7030 thermosettable isophthalic polyester resin (62% solids in styrene, 1,200 cps Brookfield viscosity, <5 Gardner color, 28 acid number (solids), <0.15 wt-% water, 73-100° F. flash point range; supplied by Ashland Chemical, Inc., Dublin, Ohio USA).
[3]Equal weight blend of the LPA of Example 1 and the vinyl ester resin of Example 2.
[4]AROPOL ™ 59036 MgO supplied at 11 wt-% actives (Ashland Chemical, Inc., Dublin, Ohio USA).

TABLE 2

| Mechanical Property | Sample (wt-parts) | | |
|---|---|---|---|
| | A | B | C |
| Flex strength (psi) | 22,583 | 27,333 | 26,362 |
| Flex modulus (psi) | $1.43 \times 10^6$ | $1.45 \times 10^6$ | $1.48 \times 10^6$ |
| Tensile strength (psi) | 10,210 | 10,476 | 10,030 |
| Tensile modulus (psi) | $1.7 \times 10^6$ | $1.7 \times 10^6$ | $1.8 \times 10^6$ |
| Elongation (%) | 1.354 | 1.257 | 1.351 |
| Cold Mold/Cold Part 12" × 12" Plaque* | +2 mil | +3 mil | +2 mil |

*+ = Expansion
− = Shrinkage

As the above-tabulated data demonstrate, good physical properties and shrinkage control were achieved by the LPA independent of the ratio of vinyl ester resin and polyester resin. Also of note, is the degree of expansion which is the same for all of the formulations.

EXAMPLE 4

Additional reinforced formulations were compounded as described in Example 3, except that the ratios of LPA: vinyl ester resin: polyester resin were varied. Fourteen different formulations were used as indicated by the circles in FIG. 1 (one formulations has duplicated runs while two formulations have triplicate runs). Shrinkage measurements and tensile measurements of the 14 reinforced formulations were measured. The shrinkage and tensile strength data were entered and analyzed by the ECHIP computer program (ECHIP Inc., Hockessin Mill Plaza, Ste. 6, 7460 Lancaster Road, Hockessin, DE 19707) that generates and analyzes the design experiment by producing a contour plot picture based on the actual data which plot the dependence of the measured properties on the mixture variables.

The ECHIP contour plots depict the trends of shrinkage versus ternary compositions as displayed graphically in FIG. 1. In FIG. 1, the circles represent the formulations actually made and tested (as described above). The asterisks within the ternary diagram represent a boundary defined by such formulations. The circles were omitted from FIG. 2 for ease of reading. As can be seen from FIG. 1, at a fixed level of LPA concentrated, the SMC plaque shrinkage is independent of the ratio of blends of isopolyester resin and vinyl ester resin. The shrinkage data for FIG. 1 is set forth below in Table 3.

TABLE 3

| Data Point | Shrinkage (mil/ft)* |
|---|---|
| B | −11.467 |
| . | −10.200 |
| C | −8.933 |
| . | −7.667 |
| D | −6.400 |
| , | −6.400 |
| E | −3.867 |
| . | −2.600 |
| F | −1.333 |
| , | −0.067 |
| G | +1.200 |
| . | 2.467 |
| H | +3.733 |
| , | 5.000 |

*+ = Expansion
− = Shrinkage

Figure 2:
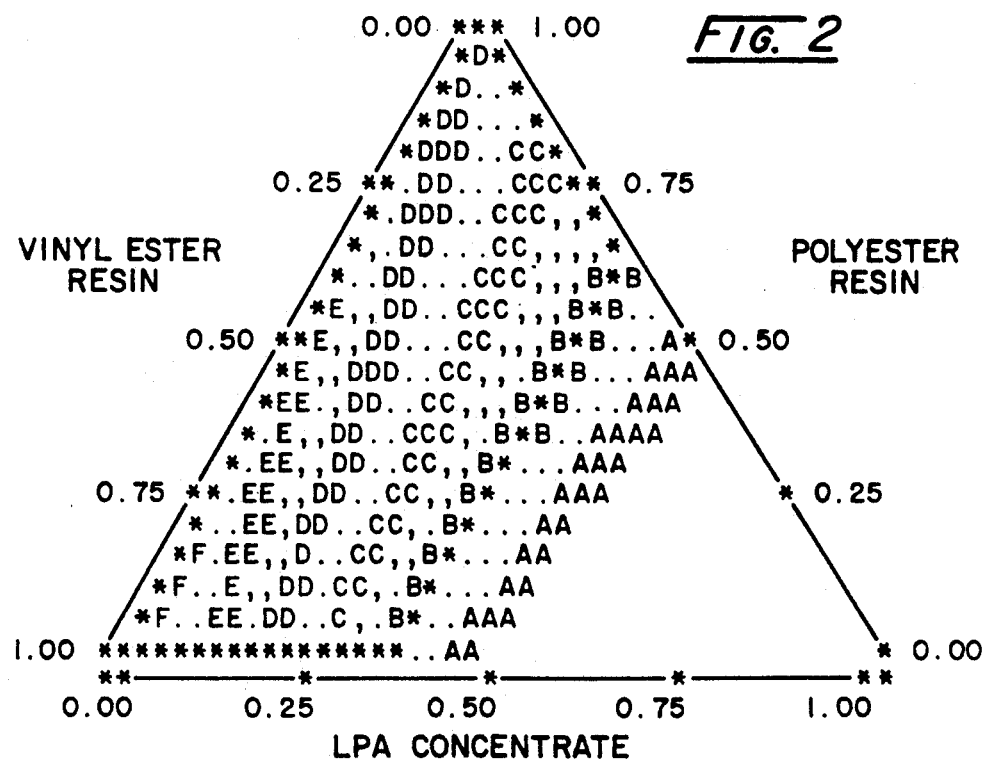
FIG. 2 is a contour plot of tensile strengths of SMC reinforced plaques versus ternary compositions of Example 4.

FIG.2 shows the ECHIP contour plot of tensile strengths of the SMC reinforced plaques versus ternary composition. Good physical properties are seen over a wide range of ternary compositions. The tensile strength data for FIG. 2 is set forth below in Table 4.

TABLE 4

| Data Point | Tensile Strength (psi) |
|---|---|
| A | 9,000 |
| . | 9,600 |
| B | 10,200 |
| , | 10,800 |
| C | 11,400 |
| . | 12,000 |
| D | 12,600 |
| , | 13,200 |
| E | 13,800 |
| . | 14,400 |
| F | 15,000 |
| , | 15,600 |

We claim:

1. A thermosettable resinous composition which comprises:
   (a) between about 0 and 95 wt-% of a thermosettable vinyl ester resin;
   (b) between about 5 and 100 wt-% of a thermosettable polyesters resin; and
   (c) between about 5 and 40 wt-% of a low profile additive comprising a non-gelling, saturated polyester formed from dibasic acid and an EO/PO block copolymer having an EO/PO molar ratio ranging from about 0.1 to 0.9, said polyester having an acid value of greater than about 10.

2. The composition of claim 1 wherein said block copolymer includes a compound having groups reactive with EO and PO.

3. The composition of claim 2 wherein said groups of said compound are selected from one or more of hydroxyl groups, thiol groups, carboxyl groups, and amine groups.

4. The composition of claim 2 wherein said compounds are selected from one or more of the following: alkylene glycols having between 2 and 8 carbon atoms, diethylene glycol, dipropylene glycol, triethylene glycol, tripropylene glycol, glycerin, trimethylol propane, pentaerythritol, dithioerythritol, dithiothritol, citric acid, trioxypropylene triamine, ad trioxyethylene triamine.

5. The composition of claim 1 wherein said dibasic acid or its corresponding anhydride contains between about 4 and 12 carbon atoms.

6. The composition of claim 1 wherein said polyester (c) has an acid value ranging from between 10 and 30.

7. The composition of claim 1 wherein said polyester (c) has a molecular weight of greater than about 6,000.

8. The composition of claim 7 wherein said molecular weight ranges from between about 6,000 and 60,000.

9. The composition of claim 6 wherein said polyester (c) has a molecular weight of between about 6,000 and 60,000.

10. The composition of claim 1 wherein said thermosettable polyester resin (b) is an isophthalic acid or anhydride-based polyester resin.

11. A method for making a thermosettable resinous composition, which comprises blending the following ingredients:
    (a) between about 0 and 95 wt-% of a thermosettable vinyl ester resin;
    (b) between about 5 to 100 wt-% of a thermosettable polyester resin; and
    (c) between about 5 and 40 wt-% of a low profile additive comprising a non-gelling, saturated polyester formed from dibasic acid and an EO/PO block copolymer having an EO/PO molar ratio ranging from about 0.1 to 0.9, said polyester having an acid value of greater than about 10.

12. The method of claim 11 wherein said copolymer includes a compound having groups reactive with EO and PO.

13. The method of claim 12 wherein said groups of said compound are selected from one or more hydroxyl groups, thiol groups, carboxyl groups, and amine groups.

14. The method of claim 12 wherein said compounds are selected from one or more of the following: alkylene glycols having between 2 and 8 carbon atoms, diethylene glycol, dipropylene glycol, triethylene glycol, tripropylene glycol, glycerin, trimethylol propane, pentaerythritol, dithioerythritol, dithiothritol, citric acid, trioxypropylene triamine, and trioxyethylene triamine.

15. The method of claim 11 wherein said dibasic acid or its corresponding anhydride contains between about 4 and 12 carbon atoms.

16. The method of claim 11 wherein said polyester (c) has an acid value ranging from between about 10 and 30.

17. The method of claim 11 wherein said polyester (c) has a molecular weight of greater than about 6,000.

18. The method of claim 17 wherein said molecular weight ranges from between about 6,000 and 60,000.

19. The method of claim 16 wherein said polyester (c) has a molecular weight of between about 6,000 and 60,000.

20. The method of claim 11 wherein said thermosettable polyester resin (b) is an isophthalic acid or anhydride-based polyester resin.

* * * * *